(12) United States Patent
Dang (10) Patent No.: US 9,038,800 B2
(45) Date of Patent: May 26, 2015

(54) CLUTCH ASSEMBLY

(75) Inventor: Toan Dang, Richmond (AU)

(73) Assignee: Automatic Technology (Australia) Pty. Ltd., Melbourne (AU)

( * ) Notice: Subject to any disclaimer, the term of this patent is extended or adjusted under 35 U.S.C. 154(b) by 270 days.

(21) Appl. No.: 13/635,184

(22) PCT Filed: Mar. 15, 2011

(86) PCT No.: PCT/AU2011/000290
§ 371 (c)(1),
(2), (4) Date: Dec. 11, 2012

(87) PCT Pub. No.: WO2011/113094
PCT Pub. Date: Sep. 22, 2011

(65) Prior Publication Data
US 2013/0140130 A1  Jun. 6, 2013

(30) Foreign Application Priority Data

Mar. 15, 2010 (AU) .................................. 2010901077
May 3, 2010 (AU) .................................. 2010901885

(51) Int. Cl.
*E06B 9/74* (2006.01)
*F16D 11/14* (2006.01)
(Continued)

(52) U.S. Cl.
CPC . *F16D 11/14* (2013.01); *E06B 9/74* (2013.01); *E05Y 2201/216* (2013.01); *E05Y 2201/244* (2013.01); *E05Y 2800/426* (2013.01); *E06B 9/322* (2013.01); *E06B 9/42* (2013.01);
(Continued)

(58) Field of Classification Search
CPC ... E06B 9/74; E06B 2009/68; E06B 2009/78; F16D 43/2024
USPC ................................ 192/54.5, 93 A; 160/312
See application file for complete search history.

(56) References Cited

U.S. PATENT DOCUMENTS 1,036,560 A * 8/1912 Campbell .................. 192/93 A
2,061,990 A   11/1936 Tyler et al.
(Continued)

FOREIGN PATENT DOCUMENTS

AU   2010901077   3/2010
AU   2010901885   5/2010
(Continued)

OTHER PUBLICATIONS

International Search Report and Written Opinion for PCT/AU2011/000290, filed Mar. 15, 2011, mailed Jun. 29, 2011, 5 pgs.
(Continued)

*Primary Examiner* — Richard Lorence
(74) *Attorney, Agent, or Firm* — Taylor English Duma LLP (57) ABSTRACT

The invention relates to a clutch assembly (8) for providing selective engagement with a rotatable shaft, in particular for selecting between manual and powered driving of an output drive such as a door, shutter or gate. The clutch assembly (8) comprises a stop (16) arranged to rotate with the shaft (18), a cam (20) arranged to move relative to the shaft (18), and a follower (24) arranged to rotate around the shaft (18) and axially movable along the shaft in and out of engagement with the stop (16). The follower (24) is operatively associated with the cam (20) so that movement of the follower relative to the cam brings the follower into engagement with the stop (16) by axial movement, so causing rotation of the shaft (18).

16 Claims, 12 Drawing Sheets (51) Int. Cl.
  *E06B 9/322* (2006.01)
  *E06B 9/42* (2006.01)
  *E06B 9/78* (2006.01)
(52) U.S. Cl.
  CPC ...... *E06B2009/785* (2013.01); *E05Y 2900/132* (2013.01); *E05Y 2900/146* (2013.01); *E05F 15/603* (2015.01)

(56) References Cited

U.S. PATENT DOCUMENTS

| | | | |
|---|---|---|---|
| 4,114,746 | A | 9/1978 | Usui et al. |
| 4,519,487 | A | 5/1985 | Florin |
| 6,202,330 | B1 | 3/2001 | Bolton |
| 6,381,903 | B1 | 5/2002 | Desrochers et al. |
| 7,240,582 | B1 | 7/2007 | Manaras et al. |

FOREIGN PATENT DOCUMENTS

| | | |
|---|---|---|
| CN | 201024818 | 2/2008 |
| DE | 3426428 | 8/1985 |
| JP | 09125844 | 5/1997 |
| SU | 555237 | 4/1997 |

OTHER PUBLICATIONS

International Preliminary Report on Patentability for serial No. PCT/AU2011/000290, filed Mar. 15, 2011, mailed Aug. 10, 2012, 13 pgs.
Written Opinion of the International Searching Authority for serial No. PCT/AU2011/000290, filed Mar. 15, 2011, mailed Jun. 29, 2011, 6 pgs.

* cited by examiner

CLUTCH ASSEMBLY

FIELD OF THE INVENTION

The invention relates to a clutch assembly, and in particular to a clutch assembly for providing selective engagement with a rotatable shaft. The clutch assembly may be used for selecting between manual and motor powered driving of an output drive.

BACKGROUND OF THE INVENTION

In this specification, where a document, act or item of knowledge is referred to or discussed, this reference or discussion is not an admission that the document, act or item of knowledge or any combination thereof was at the priority date part of common general knowledge, or known to be relevant to an attempt to solve any problem with which this specification is concerned.

Powered closures, such as sliding, roller or sectional doors, shutters, gates and the like are in common use for access control to areas, such as garages, car parks, private property, warehouses, factories, etc. Such closure arrangements are typically driven by operator units incorporating electric motors coupled to drive the closure between open and closed positions in an appropriate manner.

In the event of a power failure, fire or other unforeseen eventualities, the motor of such an operator unit may not be operable, and it is therefore desirable that manual operation of the closure be readily achieved independently of the motor. Indeed, for safety reasons it is often a requirement that selective manual operation be provided for powered closures.

For roller doors or shutters in industrial applications, in particular where the operator unit may be mounted at a significant height above the ground, manual operation of such closures may be achieved by way of an endless chain extending about an overhead chain pulley wheel. The pulley wheel engages with a shaft which in turn provides the drive to the door or shutter. The chain extends down to an area adjacent ground level where it may be pulled by an operator in order to effect movement of the door.

As the chain permanently resides on the chain pulley wheel, the chain pulley wheel cannot rotate during ordinary powered operation of the door or shutter, as a continuously rotating chain would provide a safety danger and risk derailment. It is therefore necessary to provide a clutch in the drive mechanism so that the chain pulley wheel only engages with the shaft when the door is to be manually operated.

Various clutch mechanisms have been proposed in the past. Most are highly complex, inconvenient to operate, or costly to manufacture and maintain.

SUMMARY OF THE INVENTION

According to a first aspect of the present invention, there is provided a clutch assembly for providing selective engagement with a rotatable shaft, the assembly comprising:
a stop arranged to rotate with the shaft;
a cam arranged to move relative to the shaft;
a follower arranged to rotate around the shaft and to be axially movable along the shaft in and out of engagement with the stop;
wherein the follower is operatively associated with the cam so that movement of the follower relative to the cam brings the follower into engagement with the stop by axial movement, so causing rotation of the shaft.

In one embodiment, rotational movement of the follower about the shaft brings the follower into engagement with the stop by axial movement. In this embodiment, the cam is arranged to rotate about the shaft, and the assembly is configured such that the cam remains substantially stationary as the follower moves towards engagement with the stop. Preferably, once the follower is engaged with the stop, further rotation of the follower results in rotation of the cam with the follower.

In a preferred form, the assembly is configured and dimensioned such that when the follower engages with the stop, torque is applied by the follower to the cam to rotate the cam about the shaft. Preferably, the assembly includes friction means to restrain movement of the cam about the shaft until further axial movement of the follower is prevented by engagement with the stop. Accordingly, at this point further camming action is not possible, and rotation of the follower results in torque being applied to the cam to overcome the restraining force provided by said friction means.

In a preferred form, axial movement of the cam along the shaft is limited by a retaining assembly. The retaining assembly may include a biasing element, arranged to act on the cam in an axial direction. The biasing element may comprise one or more wave washers, and the or each wave washer may be disposed around the shaft between two thrust washers. The retaining assembly may be held in axial position on the shaft by a circlip or similar means. The biasing element may be arranged to act on the cam bushing.

The cam preferably includes a surface (such as a planar face) for frictional engagement with a complementary stationary face of the assembly. This frictional engagement may be at least in part caused by the action of the biasing element of the retaining assembly.

The assembly may include one or more further biasing elements, arranged so as to act upon the cam to provide further frictional restraint to the rotation of the cam.

The one or more further biasing elements assist in precluding rotation of the cam until axial movement of the follower is prevented by its engagement with the stop.

The restraining force applied to the cam can be selected as desired by selection of the dimensions or characteristics of the retaining assembly and/or the one or more further biasing elements.

Said one or more further biasing elements may comprise one or more spring loaded plunger units, which may be arranged to register with one or more respective recesses formed within a face of the cam.

Each plunger unit may be mounted in a recess in said stationary face of the clutch assembly.

The follower may comprise a chain pulley wheel for engaging with a manual device (such as a chain) so that the follower may be rotated manually.

In an alternative embodiment, rotational movement of the cam about the shaft brings the follower into engagement with the stop by axial movement. In this embodiment, the assembly is configured so that movement of the follower is substantially limited to axial movement toward the stop until engagement occurs. Once the follower and the stop are engaged, the follower rotates with the cam. Preferably, the assembly includes friction means to restrain movement of the follower about the shaft until further axial movement of the follower is prevented by engagement with the stop. Accordingly, at this point further camming action is not possible, and rotation of the cam results in torque being applied to the follower to overcome the restraining force provided by said friction means.

In this alternative embodiment, the cam may comprise a chain pulley wheel for engaging with a manual device (such as a chain) so that the cam may be rotated manually.

Common to both the alternative embodiments detailed above, the assembly is configured such that once the stop and follower have engaged one another, continued rotation (eg. by way of a chain) of the follower or the cam about the shaft results in the shaft, stop, follower and cam rotating together as a single unit.

The stop is preferably interlocked with the shaft so that the two rotate together. This may be achieved in any suitable way, eg. by keying, a split pin arrangement, or complementary splines.

Alternatively, the stop may be provided as an integral part of the shaft.

In a preferred form, the assembly comprises a second biasing element for resiliently biasing the follower away from engagement with the stop. The second biasing element may operate in the axial direction between the stop and the follower, with one end fixed axially relative to the shaft and an opposite end associated with the follower. The second biasing element is preferably a compression spring.

Preferably, then, the force of the second biasing element assists in the engagement of cam and follower, and serves to move the follower and the cam together, and thus away from engagement with the stop, absent relative movement between the follower and the cam.

The cam thus provides a camming surface shaped to urge the follower axially toward the stop when there is relative movement between the follower and the cam. The camming surface is preferably shaped to comprise at least one peak and one trough region (thus providing peaks and troughs in the axial displacement of a point on that surface as the follower rotates). In one embodiment, the camming surface may have a substantially sinusoidal form, where one revolution of the follower may correspond to two wavelengths of the sinusoidal form (ie. two peaks and two troughs).

Preferably, the follower has a face shaped to conform substantially with the camming surface.

In an alternative embodiment, the cam and follower may be arranged so that they positively engage one another so as to ensure the cam can be rotated about the shaft by the follower. In this embodiment, the follower may be provided with a raised step at a region of its face which registers with a trough of the camming surface of the cam when the cam and follower are arranged in the disengaged position. The cam may be provided with a stop at a peak of the camming surface. The stop of the cam and step of the follower may be both suitably configured so that they inevitably engage each other as the follower rotates about the shaft toward engagement with the stop of the assembly. Therefore, continued rotation of the follower about the shaft ensures that the cam also rotates therewith.

In one embodiment, the raised step of the face of the follower and the stop of the camming surface may be arranged so that engagement therebetween occurs substantially as the follower is brought into engagement with the stop of the assembly.

It will be appreciated that the face of the follower may be provided with one or more raised steps. Similarly, the camming surface of the cam may be provided with one or more stops.

The cam and the follower are preferably arranged so as to be concentric with the shaft.

The follower may be journalled to the shaft on a bearing element, such as a follower bushing. The cam may be journalled to the shaft on a cam bushing. Each bushing is preferably keyed to its respective component.

The second biasing element which resiliently biases the follower away from engagement with the stop may be arranged to act on the follower bushing. Preferably, the follower and the stop feature complementary teeth and recesses, the engagement of the follower with the stop involving interaction of the teeth and recesses. In a preferred form, the stop has one or more teeth projecting from the body of the stop in the axial direction, and the follower has one or more teeth-receiving recesses. The teeth and recesses may instead be provided on the follower and stop, respectively.

Axial movement of the follower therefore results in keying of the follower to the stop for mutual rotation.

In comparison with prior art arrangements, the present invention provides a more compact assembly and makes use of fewer moving parts. By employing the particular cam and follower arrangement of the invention, a significantly simpler mechanism results, avoiding the need for complex and often unreliable arrangements typical of prior art devices. In this regard, the safety and reliability of the product is increased. The present invention may therefore be readily provided as a modular unit for mounting to the shaft of a motor or gearbox assembly as required, affording operation over a wide range of applications and avoiding the need for special customisation to each respective application as required by known clutch mechanisms.

According to a second aspect of the invention, there is provided a safety assembly for preventing engagement between a driven shaft and a moveable clutch element when the shaft is rotating, the assembly comprising a blocking means to block movement of the clutch element when the shaft is rotating.

The clutch element may be configured for axial movement relative to the driven shaft, and the blocking means comprises one or more elements associated with the driven shaft and moveable from a first position in which movement of the clutch element is unimpeded to a second position in which movement of the clutch element into engagement with the shaft is prevented.

In a preferred form, each of the one or more elements are mounted for radial movement from said first to said second position under the influence of centrifugal force generated by the angular rotation of the shaft. Each of the one or more elements may be biased toward the first position by a resilient means, arranged to overcome the centrifugal force below a prescribed angular rotation of the shaft.

The one or more elements may be elongate lugs pivotally mounted at or near one end to rotate outwardly relative to the shaft into said second position, blocking movement of the clutch element. The assembly may include a member fixedly attached to the shaft to rotate therewith, the one or more elements mounted to said member.

The one or more elements may be arranged to be received within one or more recesses in said member when the blocking means is in the first position.

According to a further form of the present invention, there is provided an operator unit for a closure assembly, the operator unit including or operatively associated with either or both of the aspects of the invention defined above. The closure assembly may comprise a roller door or shutter.

BRIEF DESCRIPTION OF THE DRAWINGS

Embodiments of the invention will now be further explained and illustrated, by way of example only, with reference to the accompanying drawings in which.

DETAILED DESCRIPTION OF THE DRAWINGS

Figure 1A:
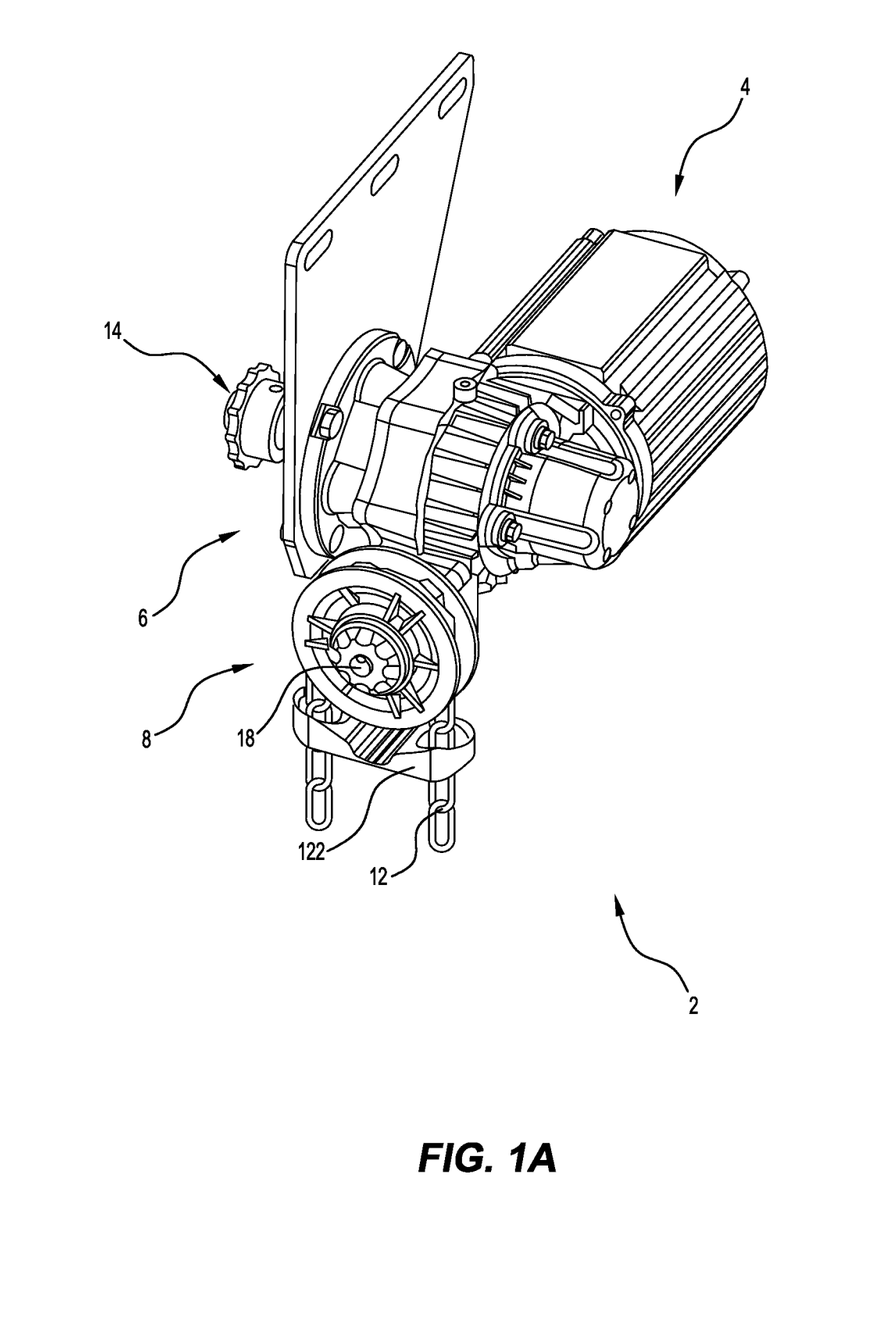
FIG. 1A is a perspective view of a powered operator unit incorporating a clutch assembly in accordance with the present invention.
Figure 1B:
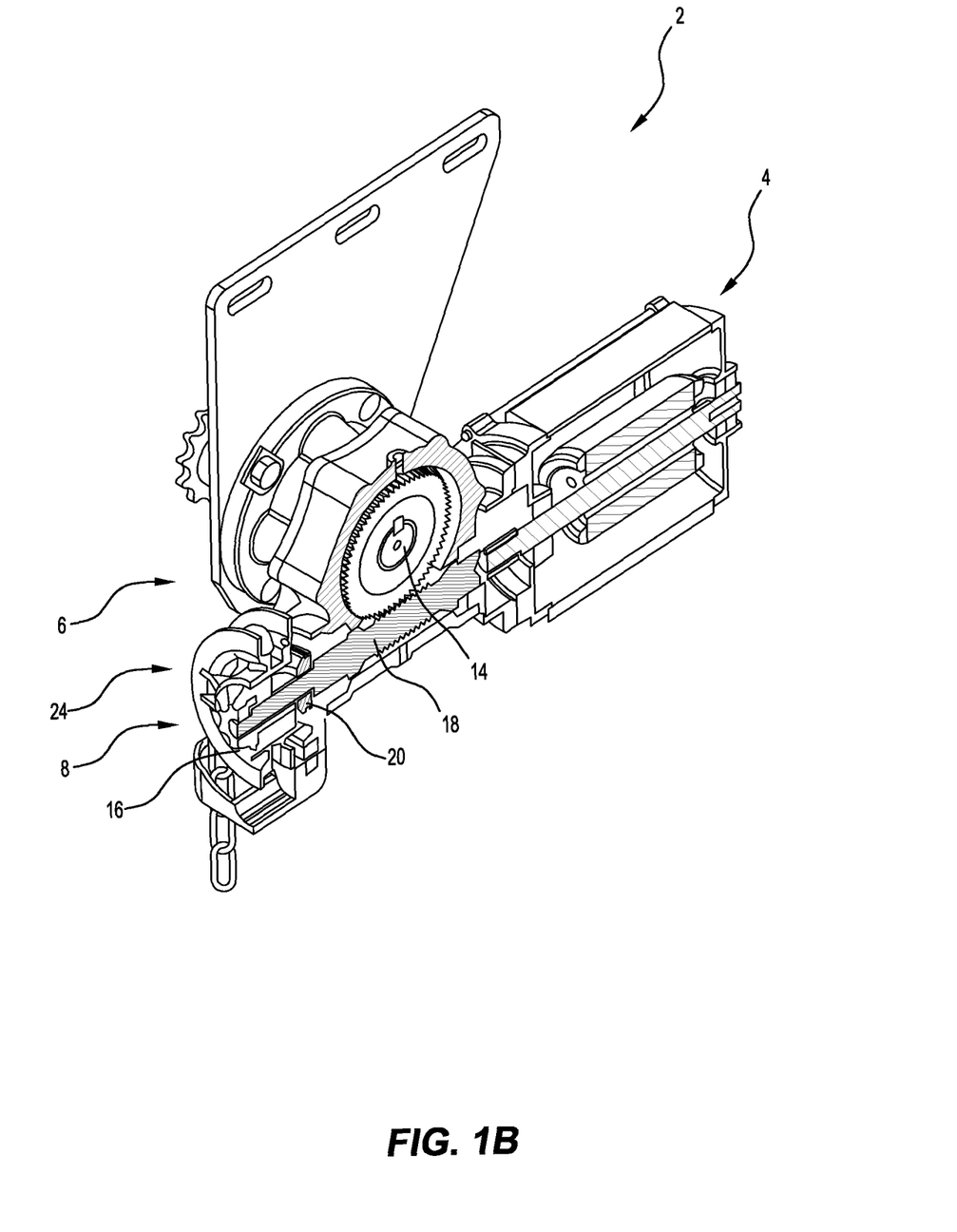
FIG. 1B is a perspective view of a cross section taken through the axis of the driven shaft of the operator unit shown in FIG. 1A.

With reference to FIGS. 1a and 1b, there is shown an operator unit 2 for powering a closure. The operator unit 2 comprises a power drive unit 4, a drive output unit 6, and a clutch assembly 8 for providing selective engagement between powered operation (provided by the power drive unit 4) and manual operation (provided by a chain 12). The output from unit 6 is an output drive shaft 14 used, in the embodiment described below, to operate an overhead garage roller door or shutter assembly (not shown), however, the skilled reader will appreciate that said output drive shaft could readily be arranged to operate other closures such as belt/chain driven overhead doors, sliding doors, roller or sectional doors, shutters, gates and the like.

Figure 2A:
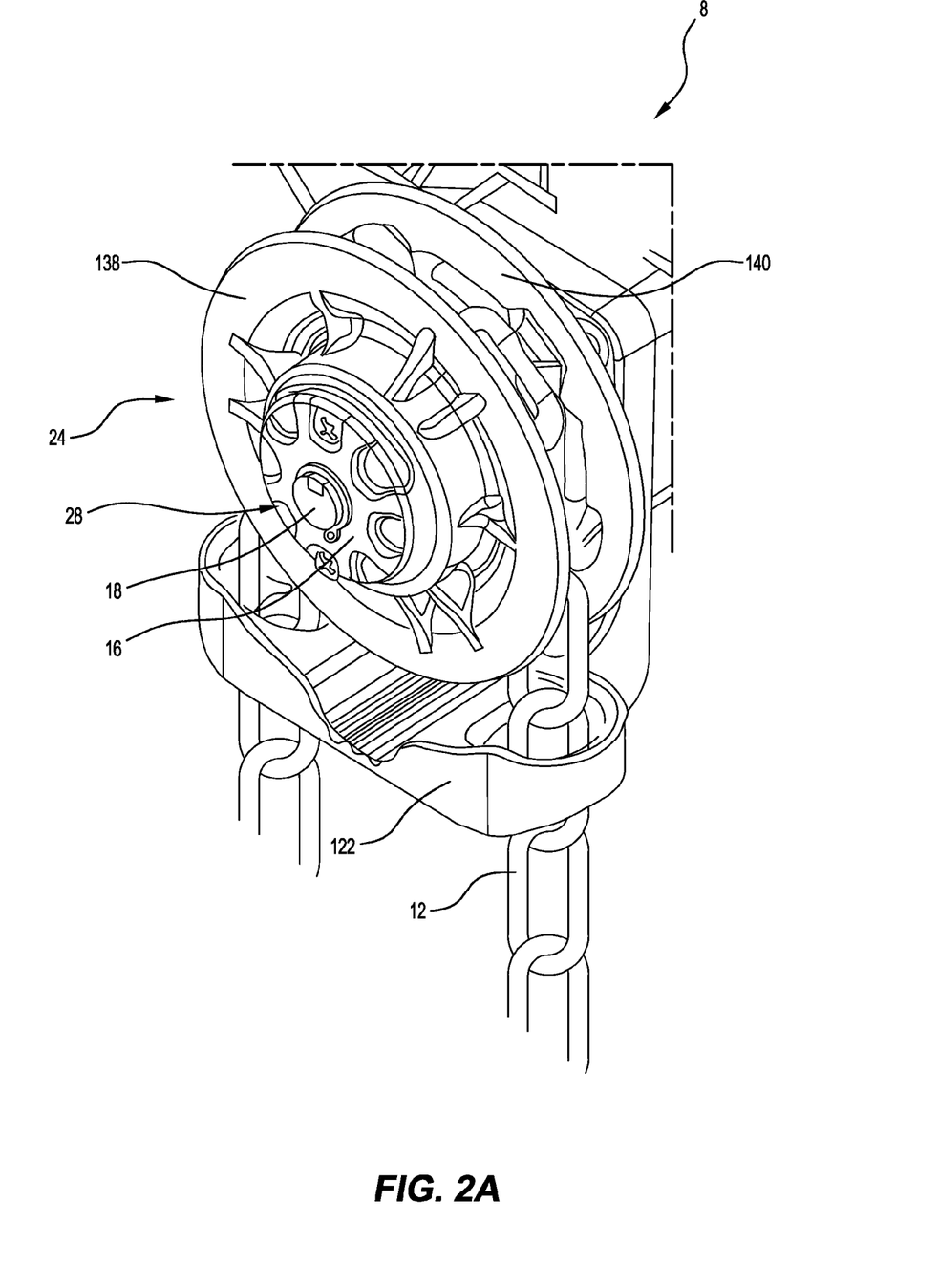
FIG. 2A is a close up perspective view of the embodiment of the clutch assembly shown in FIGS. 1A and 1B.
Figure 2B:
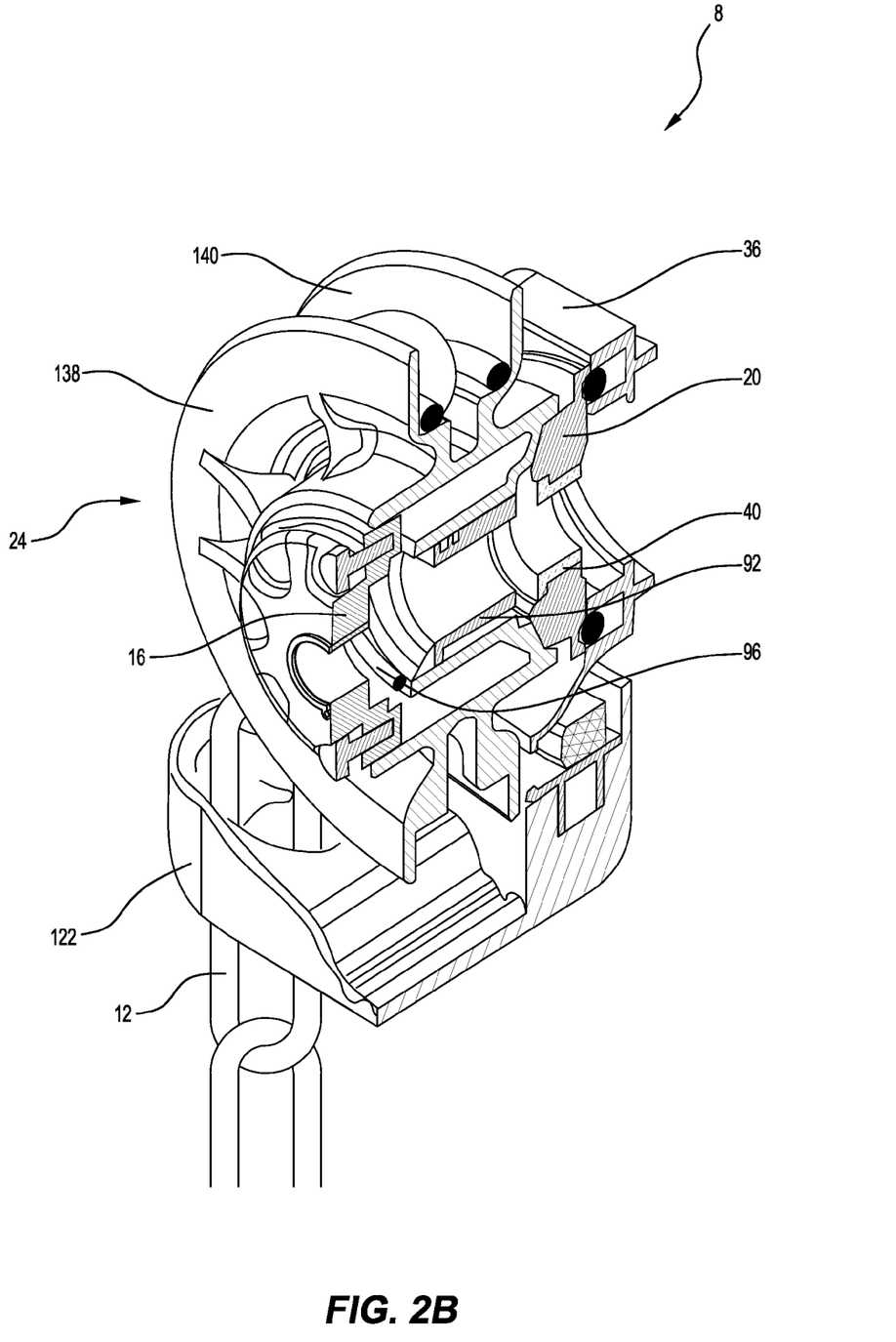
FIG. 2B is a perspective view of a cross section of the clutch assembly shown in FIG. 2A taken through the axis of the driven shaft (driven shaft removed)
Figure 3:
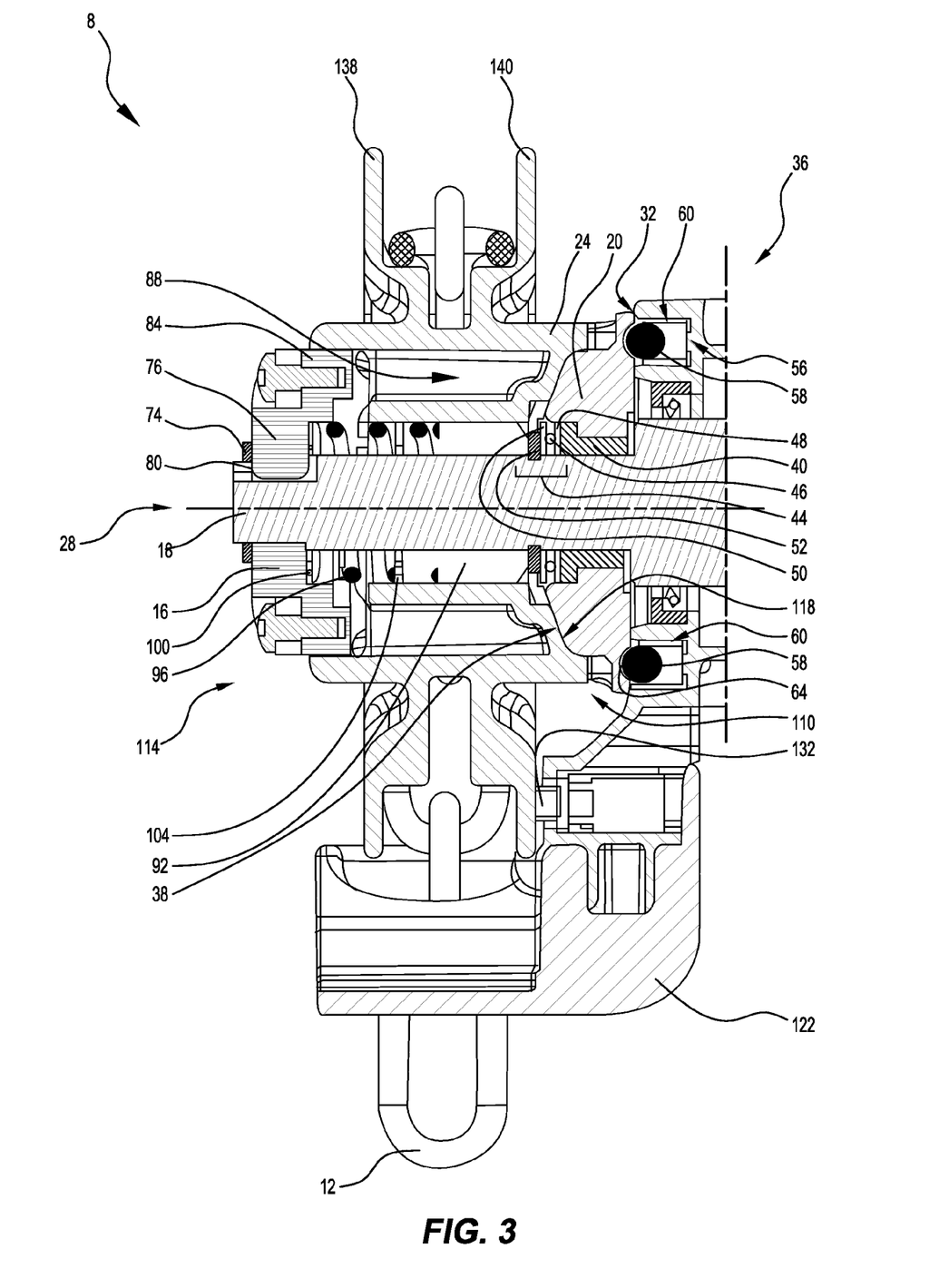
FIG. 3 is a cross section of the embodiment of the clutch assembly shown in FIGS. 2A and 2B taken along the axis of the driven shaft.

FIGS. 2a, 2b and 3 show the clutch assembly 8, which comprises a stop 16 keyed to rotate with a driven shaft 18. The clutch assembly 8 further comprises a cam 20 and a chain pulley wheel follower 24. The follower 24 is arranged to be movable between a disengaged position (in which the shaft 18 is disengaged from follower 24) for driving by the drive unit 4, and an engaged position (in which the shaft 18 is engaged with follower 24) in which the shaft 18 can be driven by an auxiliary means, in this case by manual operation of the chain 12. As explained in detail below, follower 24 is arranged so as to be operatively associated with the cam 20 so that rotation of the follower about the shaft 18 brings the follower into engagement with the stop 16, thereby rotating the shaft 18.

Clutch assembly 8 is disposed generally near the end 28 of the shaft 18. The follower 24 is arranged to be axially moveable along a part of shaft 18 between the cam 20 and the stop 16. Cam 20 and follower 24 are mounted on respective bushings 40 and 92 for rotation about the shaft 18. As explained below, cam 20 and follower 24 are arranged such that, when in the disengaged position, both components remain stationary while the shaft 18 is under drive by the powered unit 4.

The structure and function of each of the components of the clutch assembly 8 shown in the figures is described in turn below.

Figure 4A:
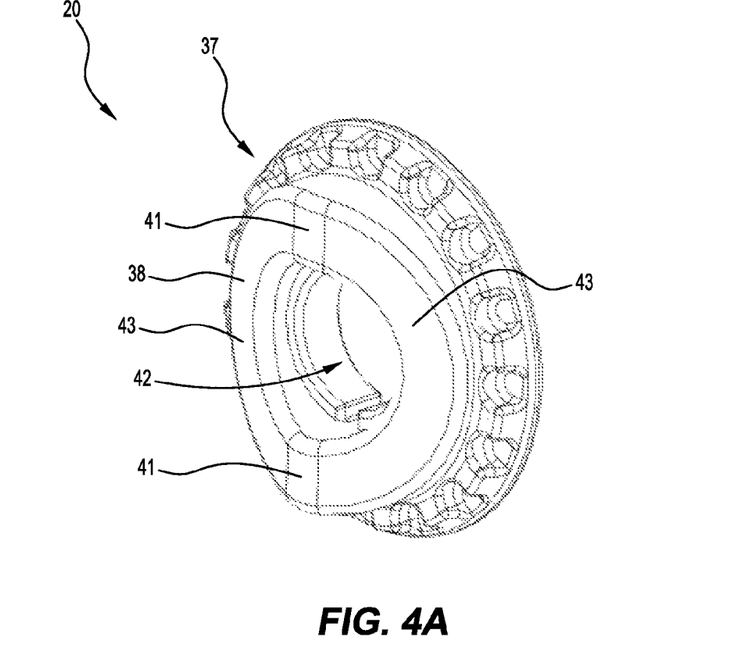
FIG. 4A is a perspective view of the cam shown in FIG. 3.
Figure 4B:
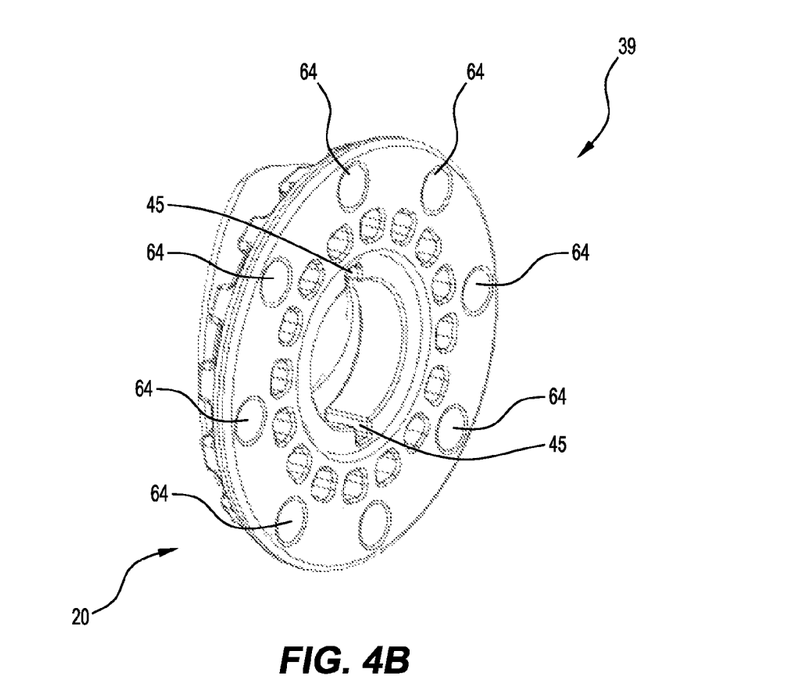
FIG. 4B is a perspective view of the opposite side of the cam shown in FIG. 4A.

FIGS. 4a and 4b show the cam 20. Cam 20 has opposite sides 37 and 39. Side 39 presents a planar face, to bear against face 32 of a clutch reducer 36 (see FIG. 5B). Clutch reducer 36 is bolted to the housing of the assembly, and separates the clutch assembly 8 from the rest of the operator unit 2. The bore of clutch reducer 36 retains an oil seal arrangement around the shaft to isolate the clutch assembly 8 from the interior of the drive output unit 6 (see FIG. 3).

Figure 5A:
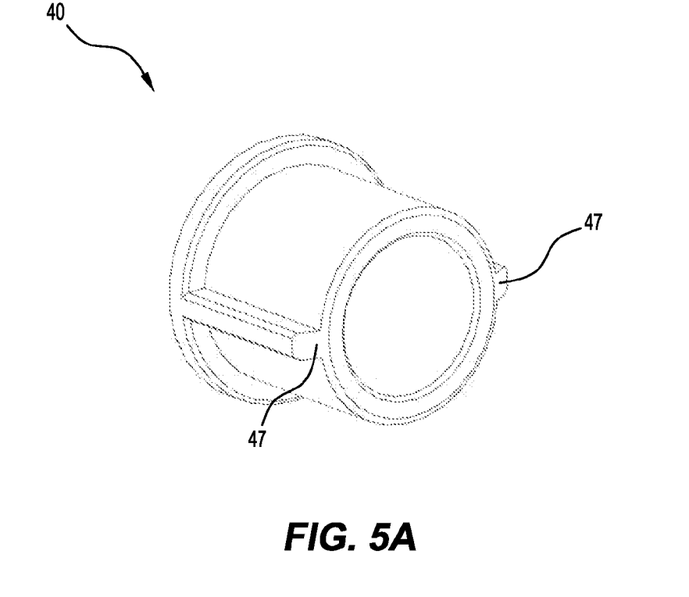
FIG. 5A is a perspective view of the flange bushing upon which the cam sits as shown in FIG. 3.

Cam 20 is generally circular in form, with a concentrically formed bore 42 provided therein sized to fit on a flange bushing 40, which in turn is sized to fit on shaft 18. Flange bushing 40 therefore provides a bearing for cam 20. The cam 20 is arranged for keying to the flange bushing 40 by way of grooves 45 running in the axial direction, which receive complimentary key portions 47 of flange bushing 40 (see FIG. 5a). Cam 20 comprises on its opposite side 37 a camming surface 38. The camming surface 38 is shaped having peak 41 and trough 43 formations projecting in the axial direction.

The cam 20 is held in place against face 32 of the clutch reducer 36 by a retaining assembly 44 (see FIG. 3). The retaining assembly 44 includes a wave washer 46 disposed intermediate two thrust washers 48, 50, and a circlip 52 which engages with an annular groove in the shaft 18 to capture cam 20 between retaining assembly 44 and face 32, affording very restricted axial movement along shaft 18 away from face 32. The thrust washer 48 is suitably sized to bear directly against the flange bushing 40. The retaining assembly 44 therefore maintains a prescribed degree of axial force against the flange bushing 40 thereby ensuring that, in normal operation of the operator unit 2, the cam 20 is pressed against face 32 and the friction therebetween prevents rotation of the cam 20 about the shaft 18. It will be appreciated that further wave washers could be incorporated within the retaining assembly 44 if required.

Figure 5B:
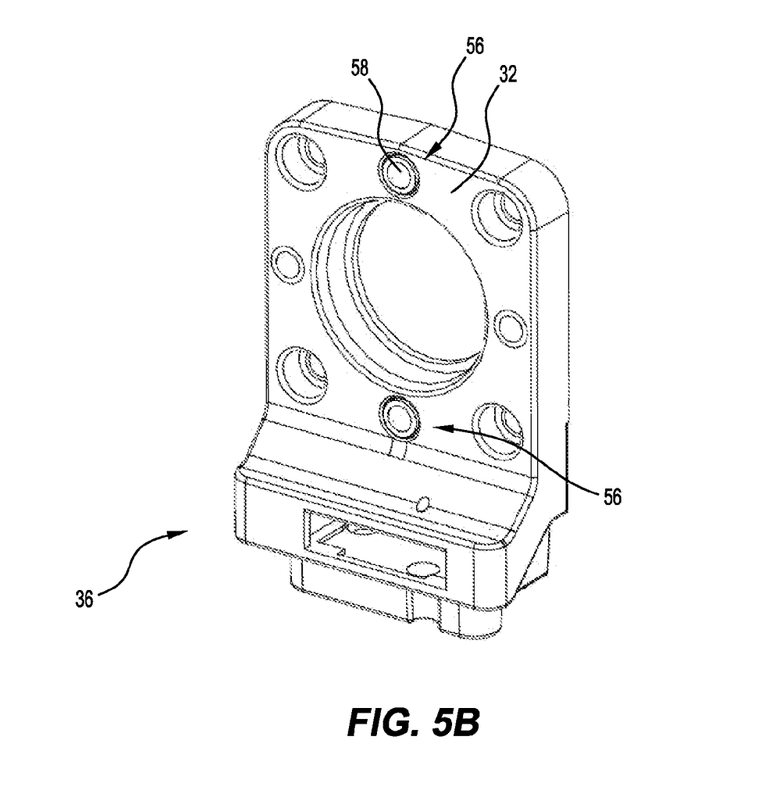
FIG. 5B is a perspective view of the face of the clutch reducer shown in FIG. 3.

With reference now to FIG. 5b, the restraining force applied to the cam 20 is augmented by two spring loaded plunger units 56 which are set within clutch reducer 36, spaced equidistant from the axis of rotation and located at diametrically opposed 'north' and 'south' positions about said axis as shown. Each of the plunger units 56 comprises a stainless steel ball 58 set within a cylindrical housing 60 (see FIG. 3) engaged by force fit in a blind bore machined in the face 32 of the clutch reducer 36 which, when installed within the clutch reducer 36, protrude beyond face 32. Within the cylindrical housing 60 is arranged a compression spring (not shown), preloaded to exert a force upon the ball 58. Each cylindrical housing 60 has an inward lip around its end to allow ball 58 to protrude from face 32, while being retained within the opening of the housing 60. Ball 58 can thus move inward within the housing 60 against the spring. Each of the plunger units 56 are arranged so that the balls 58 may rotate within its respective housing 60. It will be appreciated that a different number of plunger units 56 (eg. 4 units, angularly equispaced around the axis of rotation) may be employed, depending on the restraining force required to be applied to cam 20.

The positioning of the plunger units 56 is arranged so that balls 58 may register with a plurality of shallow dished recesses 64 formed within face 39 of the cam 20. In this embodiment, there are eight such recesses, angularly equispaced around the axis of rotation at the same radius as the plunger units 56.

Although not essential to the function of the present invention, the inventors have found that the engagement of plunger units 56 into recesses 64 provides a useful additional means (over and above the friction between the abutting planar faces) to restrain the cam 20 from rotation about shaft 18 in normal operation of the operator unit 2, unless and until sufficient torque is provided to the cam to overcome the friction forces.

Figure 6A:
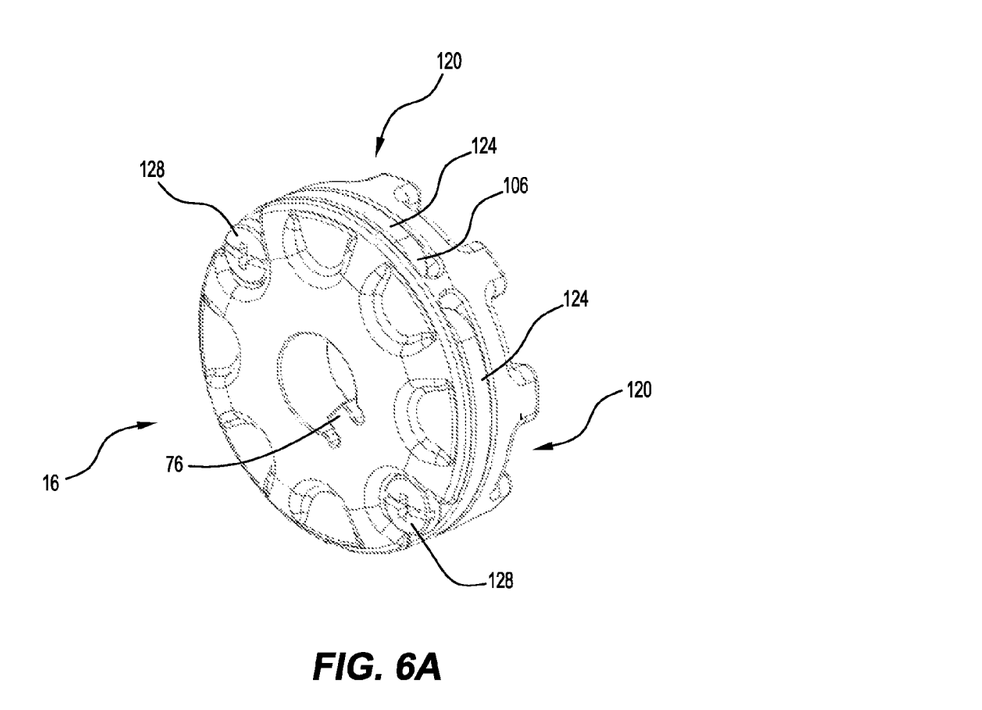
FIG. 6A is a perspective view of the stop shown in FIG. 3.
Figure 6B:
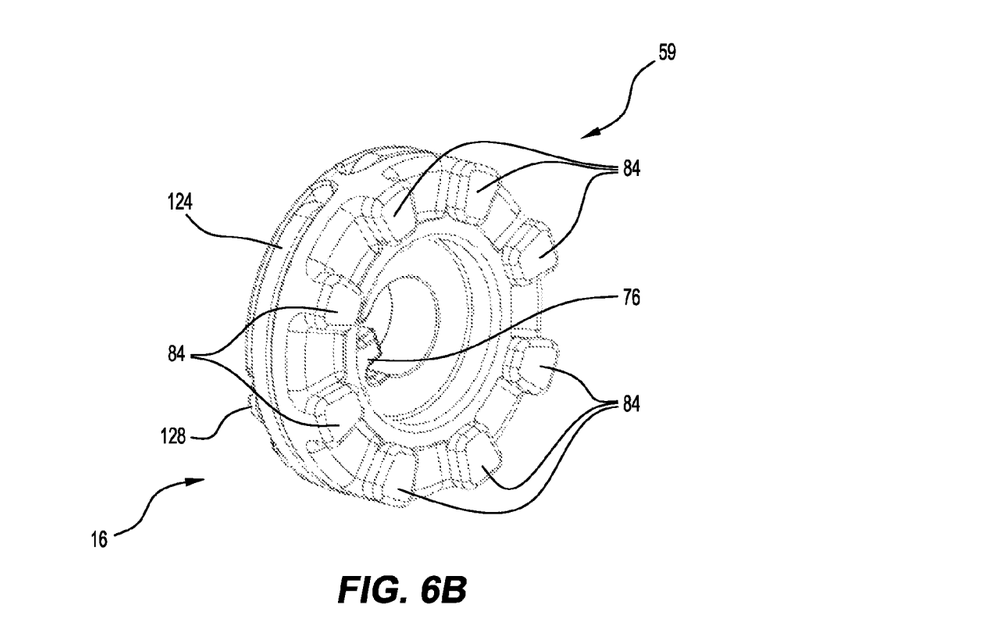
FIG. 6B is a perspective view of the opposite side of the stop shown in FIG. 6A.

With reference to FIGS. 3, 6a and 6b, the stop 16 is keyed to the shaft 18 by way of key element 76 which projects inwardly towards the axis of rotation as shown, and is held in position axially by circlip 74. The stop 16, follower 24 and cam 20 are therefore captured between circlip 74 and clutch reducer 36.

Key element 76 is sized and shaped to be received within a recess 80 formed in the end of shaft 18, so that the stop 16 and the shaft are fixedly interconnected to rotate together. It will be appreciated by one skilled in the art that many other ways of interlocking the stop 16 with the shaft 18 could be employed, and that in the alternative the two could be realised by a single integrated component.

On a side 59 of the stop 16 that faces the follower 24, the stop has a plurality of teeth 84 (in the embodiment illustrated, eight teeth are used, however the inventor has found that alternatively three or four may be used) angularly equispaced and projecting in the axial direction. Each tooth 84 is arranged to be received within a respective recess 88 formed within a hub 71 of follower 24 (see FIGS. 7a and 7b) when the follower 24 is brought into the engaged position. Engagement of the teeth 84 in recesses 88 therefore keys the follower 24 to the stop 16 so that the two rotate together. Although a plurality of complimentary teeth 84 and respective recesses 88 is illustrated, the skilled reader will appreciate that there are other ways of keying the follower 24 with the stop 16 when engaged. It will also be recognised that the teeth 84 could be provided on the follower 24 and the recesses 88 could be provided on the stop 16.

Figure 7A:
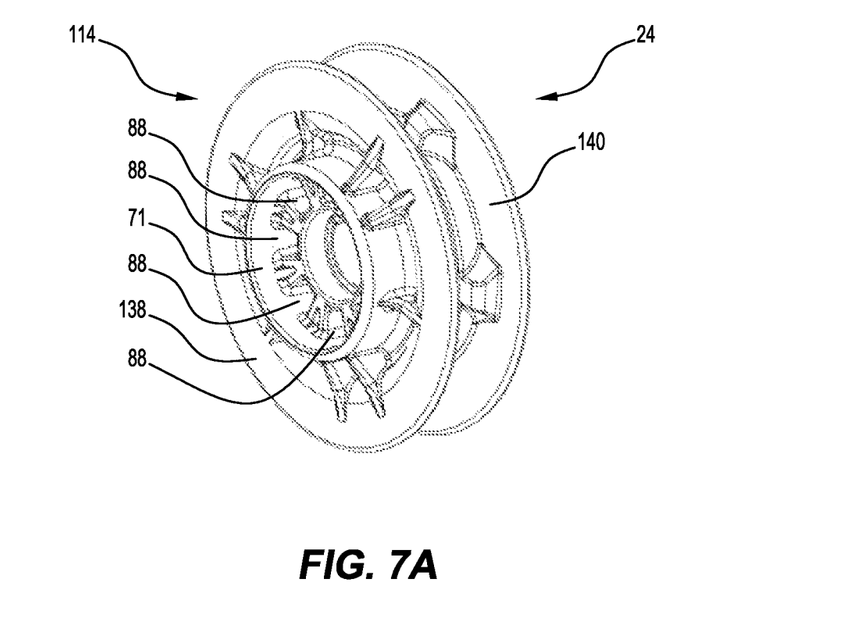
FIG. 7A is a perspective view of one side of the follower shown in FIG. 3.
Figure 7B:
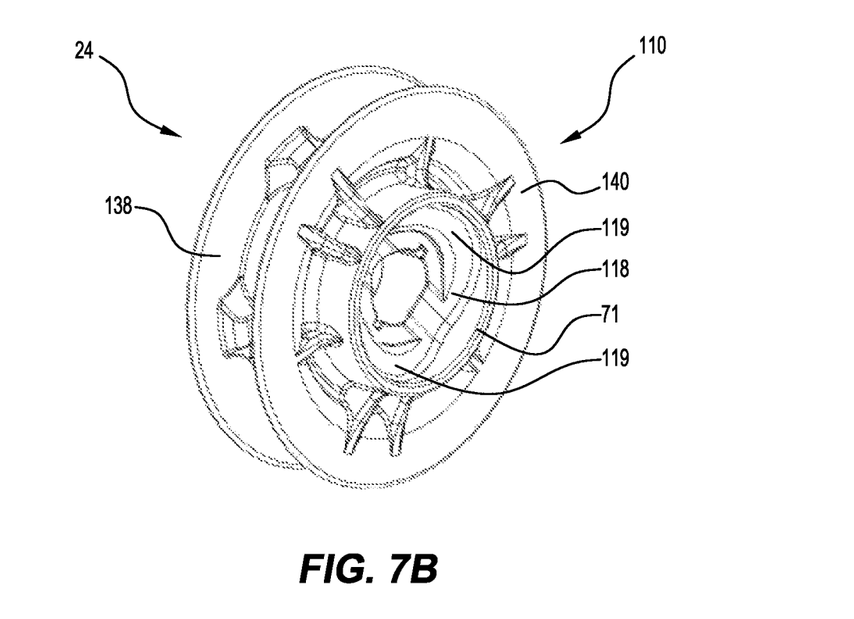
FIG. 7B is a perspective view of the opposite side of the follower shown in FIG. 7A.

With reference now to FIGS. 7a and 7b, the chain pulley wheel follower 24 is generally circular in shape, with hub 71 having a concentrically formed bore. Follower 24 is mounted on, and keyed with, a bushing 92 (in a similar manner to the mounting of cam 20 and flange bushing 40), which in turn is mounted to fit on shaft 18. The follower 24 is therefore mounted to journal around, and to move axially along a portion of, shaft 18, with bushing 92 providing the bearing for follower 24.

The follower 24 comprises opposite first and second sides 110 and 114. The first side 110 provides on hub 71 a face 118 that is arranged to cooperate with (ie. to contact and slide against, as explained further below) camming surface 38 of the cam 20. Face 118 is appropriately shaped to conform with the camming surface 38 of the cam 20. Face 118 is thus shaped in a manner complimentary to the camming surface 38, so that the two mutually register when the mechanism is in the disengaged position. In this position, the follower 24 and the cam 20 are arranged relative one another so that a peak 119 of follower face 118 registers with a trough 43 of camming surface 38. When the follower 24 is rotated by chain 12, the camming action results in the peak of face 118 sliding against the camming surface 38 out of the trough 43 and towards a peak 41 in camming surface 38, so resulting in axial movement of the follower 24 in a direction away from the cam 20.

The opposite side 114 of the follower 24 features recesses 88 in hub 71, to receive teeth 84 of the stop 16 (described above).

The chain pulley wheel follower 24 features around its circumference a plurality of transverse bulkhead portions (see FIGS. 7a, 7b) for engaging with links of the chain 12, so that the follower 24 can be rotated by a user pulling on the chain in either direction. Annular side flanges 138, 140 on either face of follower 24 assist in retaining the chain 12, and a chain guard 122 attached to the housing of the unit guides the chain run on either side, as shown in FIG. 2a.

As shown in FIG. 3, bearing against the stop 16 via thrust washer 100 is a compression spring 96 which operates axially along the shaft 18 between the stop 16 and the bushing 92 (via thrust washer 104). The spring 96 biases the follower 24 toward cam 20, into the disengaged position. During operation of the clutch assembly 8, as the follower 24 moves toward the stop, the spring 96 compresses thereby increasing the biasing force applied to the follower 24.

Spring 96 is axially restrained relative to the shaft 18 by the stop 16. It will be appreciated that a variety of alternative biasing means for the follower 24 are possible. As will be readily appreciated, the degree of biasing force will also depend on the force constant of the spring selected.

The operation of clutch assembly 8 shown in the figures is as follows. When the shaft 18 is driven by the powered drive unit 4, the follower 24 remains biased in the disengaged position by the spring 96, in register with the cam 20. When manual operation of the shaft 18 is desired (to manually open the roller door or shutter, eg. in the event of a power failure), the user pulls the chain 12 and initiates rotation of the chain pulley wheel follower 24 in the required direction about the shaft 18. The follower 24 then begins to rotate relative to camming surface 38 of the cam 20, the cam 20 remaining stationary due to the friction forces applied by the retaining assembly 44 and the plunger units 56.

Due to this camming action, further rotation of the follower 24 therefore results in the movement of the follower axially along the shaft 18 toward the stop 16. As the follower 24 continues moving toward the stop 16, the spring 96 compresses further. This has the effect of increasing the contact force between cam 20 and follower 24.

As the follower 24 continues to move axially, stop teeth 84 are received within the recesses 88 of the follower 24, thereby firmly keying the follower to the shaft 18 by way of the stop 16. Once this engagement occurs and the teeth 84 abut against the ends of recesses 88, the follower 24 can move axially no further, and therefore further rotation of follower 24 transfers torque to the cam 20, to overcome the friction force which has hitherto restrained movement of the cam about the shaft 18. It should be noted that the dimensions of the parts of the assembly are such that the peak 119 of face 118 cannot travel over the peak 41 in camming surface 38. Engagement between the stop 16 and the follower 24 is maintained provided force is being applied to the follower 24 by the chain 12.

From this point, continued rotation of the follower 24 will therefore rotate the cam 20 and the shaft 18 (as well as the spring 96 and other associated components) around the shaft axis as a single unit, thus operating the roller door or shutter assembly by way of the drive mechanism.

Rotation of the shaft 18 continues until the user releases the chain 12, at which time spring 96 biases the follower 24 back to the disengaged position, and into registration with the camming surface 38.

The clutch assembly 8 therefore provides a simple and effective mechanism, affording automatic driving engagement of the chain pulley wheel with the shaft 18 when the chain 12 is pulled, so to operate the roller door or shutter, and rapid and reliable automatic disengagement when the pull on the chain ceases, so to allow normal motor-powered operation.

Figure 8:
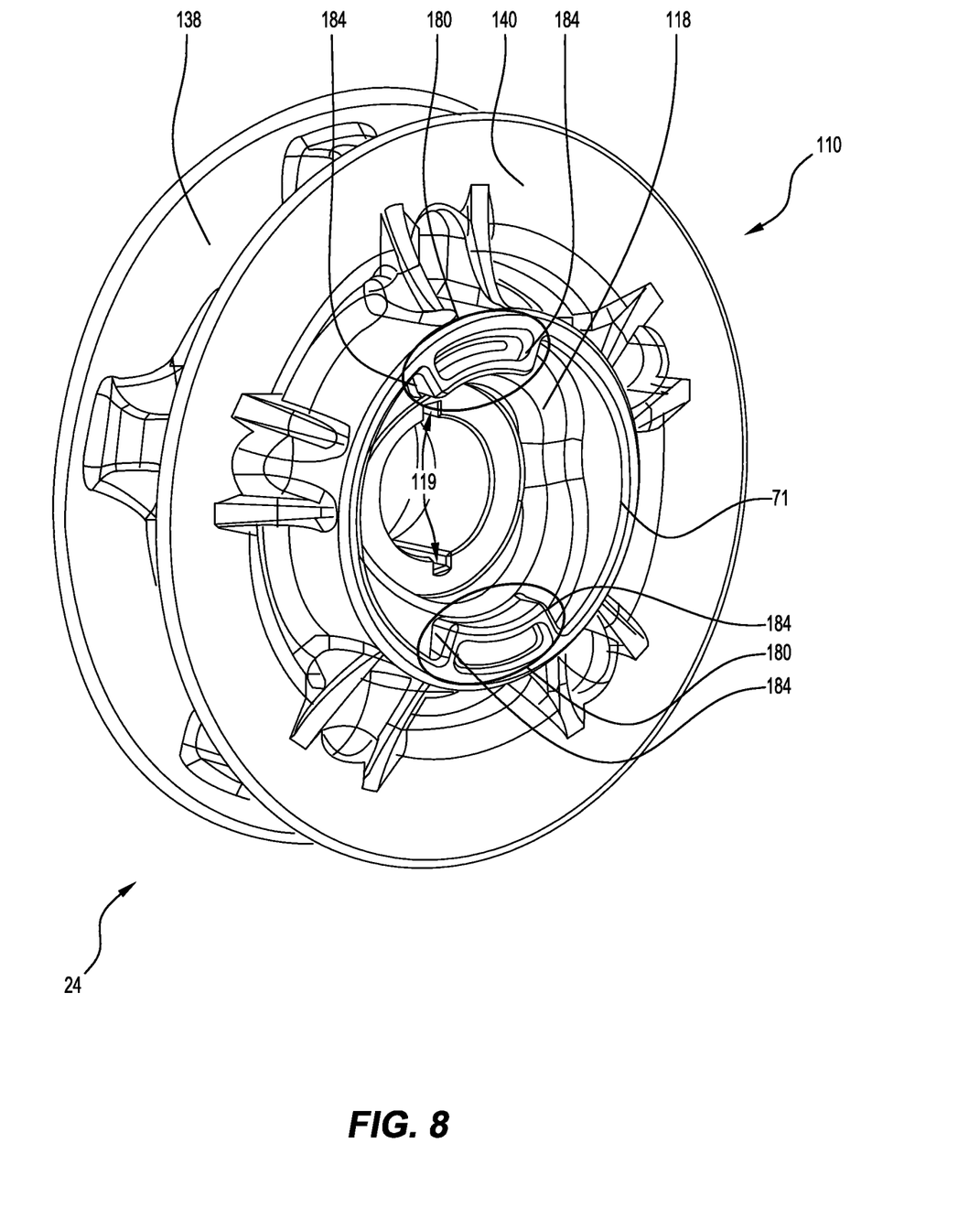
FIG. 8 is a perspective view of one side of an alternative form of follower.
Figure 9:
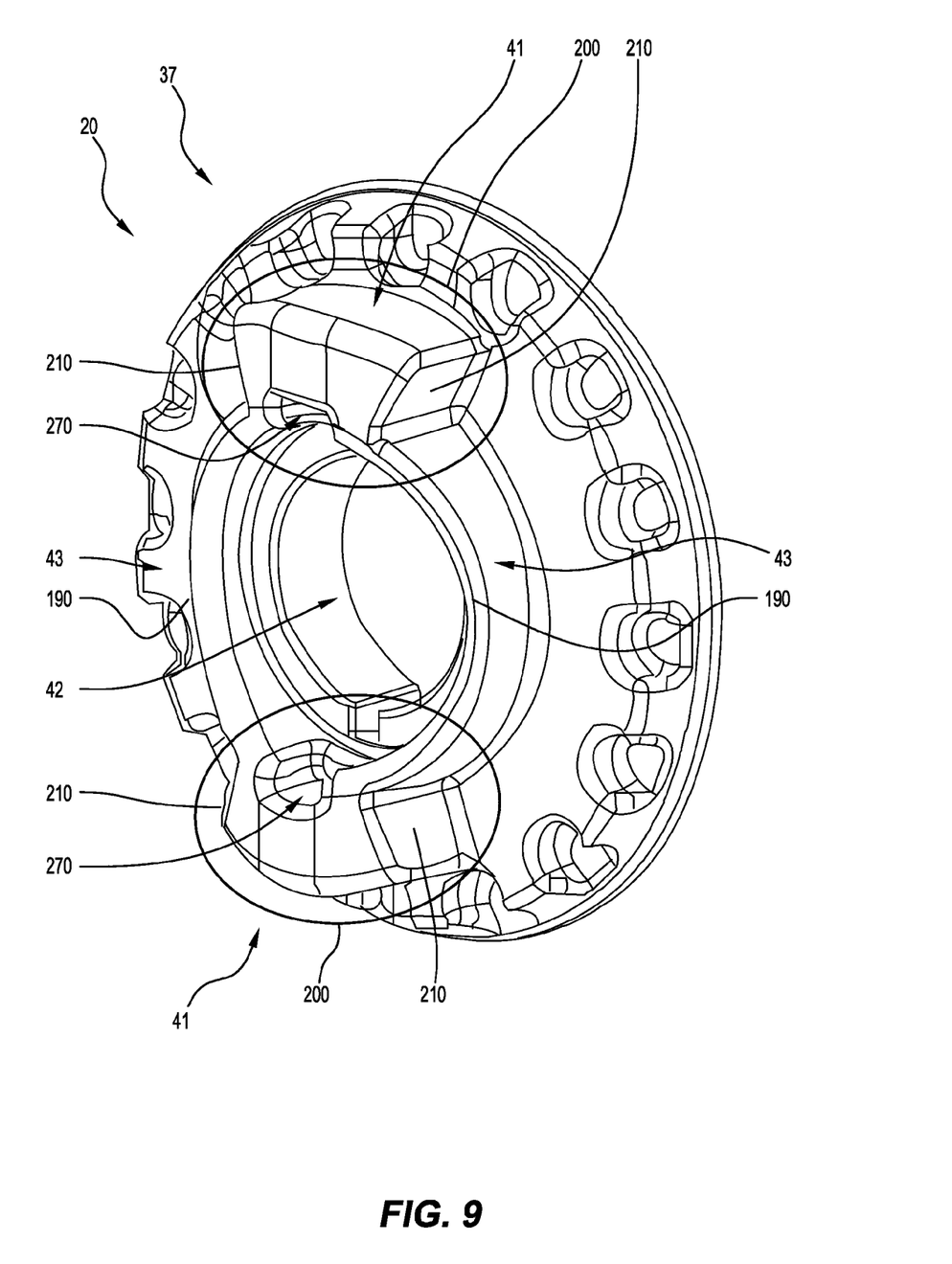
FIG. 9 is a perspective view of one side of an alternative form of cam.

The modifications shown in FIGS. 8 and 9 assist is ensuring the engagement between cam 20 and follower 24 when acutated into a position for conjoint rotation of both about shaft 18.

The follower 24 in FIG. 8 has a modified hub 71 such that ramped face 118 is provided with raised steps 180 at the respective peaks 119. Each step 180 presents planar abutment facets 184 substantially perpendicular to the circumferential direction, arranged such that each abutment facet 184 provides a distinct discontinuity at the top of face 118 as shown.

The cam 20 in FIG. 9 has a modified camming surface (compare reference 38 of FIGS. 4a and 4b) which is narrowed to form a camming ridge 190, retaining the trough 43 and peak 41 regions. However, as the camming ridge 190 approaches peak 41, the width of the ridge widens to provide a stop 200. Each stop 200 presents planar abutment facets 210 substantially perpendicular to the circumferential direction, as shown.

In use, substantially the same camming operation between the follower 24 and cam 20 occurs as has been described above. When the follower 24 is in the disengaged position, the raised steps 180 register with the respective troughs 43 of camming ridge 190 of cam 20. Once follower 24 is actuated by way of the chain, follower 24 begins to move axially along the shaft 18 due to the camming action between the follower face 118 and camming ridge 190. As raised step 180 of the follower 24 approaches a peak 41 of camming ridge 190, a point is reached where abutment facet 184 of raised step 180 engages with abutment facet 210 of stop 200. This provides a more positive engagement between cam and follower, minimising wear of the components. The skilled person will readily appreciate that the substance of such engagement could be achieved by incorporating a variety of different arrangements which serve to effectively key the cam 20 with the follower 24 during actuation of the assembly.

The embodiment of the invention described above employs the follower 24 as the member which is selectively driven (by the operator) to effect its engagement with stop 16 and thereby drive shaft 18. The skilled reader will appreciate that other forms of interoperation between the cam and follower may be used to effect this engagement. For example, in an alternative embodiment the cam element may carry the chain pulley wheel, with the follower configured to be restrained against ready rotation about the shaft (eg. by a suitable friction arrangement). In this way, rotation of the cam leads to relative rotation between cam and follower, resulting in movement of the follower axially along the shaft and into engagement with the stop. When the follower is fully engaged with the stop and can move axially no further, further rotation of the cam transfers torque to the follower, overcoming the friction force which has hitherto restrained movement of the follower about the shaft. From this point, continued rotation of the cam rotates the follower and the shaft (and other associated components) around the shaft axis as a single unit, thus operating the roller door or shutter assembly by way of the drive mechanism.

The skilled person will appreciate that variations of particular retaining assemblies such as the retaining assembly 44 may be employed. For example, in some instances, the inventors have found that the use of wave washers can be disadvantageous (by increasing wear and tear and/or generating unwanted heat due to increased frictional contact) when in contact with the moving parts. This is generally due to the hardened nature of the material from which wave washers are commonly formed.

Figure 10:
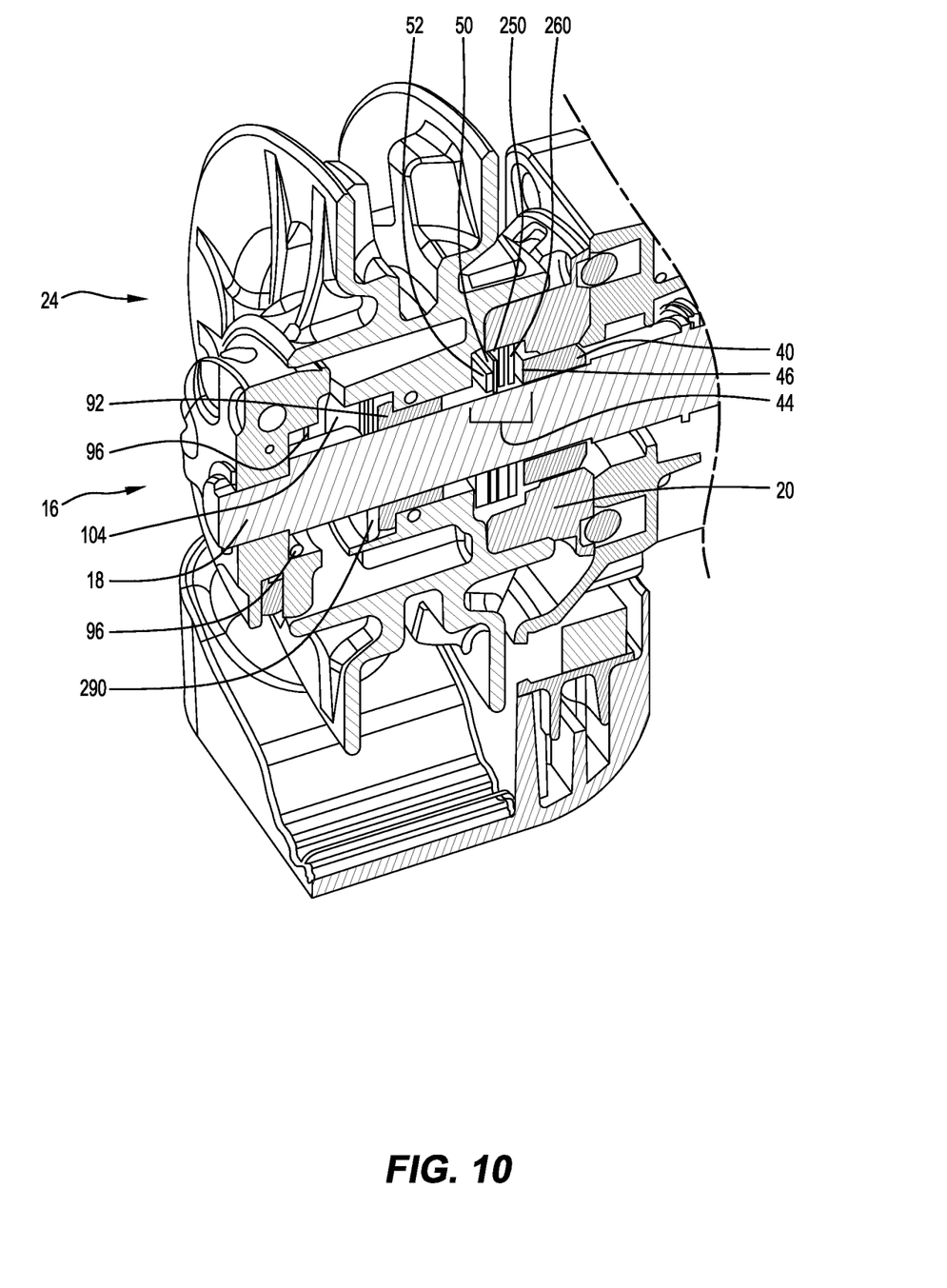
FIG. 10 is a perspective view a clutch assembly employing the follower and cam of FIGS. 8 and 9 respectively.

With reference to FIG. 10, an alternative embodiment of retaining assembly 44 (compare FIG. 3) is shown, in which a needle bearing 250 is included in order to minimise wear between moving and non-moving parts of the assembly. In this embodiment, the retaining assembly 44 is again held in position against flange bushing 40 by way of circlip 52 and thrust washer 50 in accordance with the arrangement shown in FIG. 3. However, in this embodiment wave washer 46 is arranged to bear, at one side thereof, directly upon flange bushing 40 (to which cam 20 is keyed) and, on the other side, against a further thrust washer 260. The needle bearing 250 is then provided between thrust washer 260 and thrust washer 50 thereby isolating the wave washer 46 from thrust washer 50 (which is axially restrained by circlip 52) which can move at relatively high speed when shaft 18 is driven by the electric motor. Thrust washer 260 is arranged to key with cam 20 at cut away regions 270 (shown in FIG. 9) and further assists in the isolation of wave washer 46 from the moving parts.

In operation, as the retaining assembly 44 serves to hold cam 20 in place against face 32 of the clutch reducer 36, circlip 52, thrust washer 50, and needle bearing 250 all rotate with shaft 18 when the motor drive is operating (when the clutch assembly is in the disengaged position). Due to the presence of needle bearing 250, the thrust washer 260, wave washer 46, and flange bushing 40 (and cam 20) are all able to remain stationary, without risk of wear. Therefore, in contrast with the arrangement shown in FIG. 3 in which the wave washer 46 bears directly upon thrust washers 50, 48, wave washer 46 is now isolated from any moving parts when shaft 18 rotates at speed. The same applies when cam 20 is caused to rotate about shaft 18 by way of rotation of follower 24.

It will be appreciated that similar or alternative arrangements can also be employed elsewhere in the assembly to reduce potential wear. For example, with regard to FIG. 10, a further needle bearing 290 may be provided between thrust washer 104 and bushing 92 (upon which follower 24 sits and is keyed with). In this arrangement, needle bearing 290 serves to isolate compression spring 96 from bushing 92. This is again in contrast to the arrangement shown in FIG. 3 where compression spring 96 bears directly against thrust washer 104 which, in turn, bears directly against bushing 92. The skilled person will appreciate that suitable variations and like arrangements may be employed to minimise wear.

The clutch assembly 8 also features a safety mechanism 120. The safety mechanism 120 is part of stop 16, and comprises two clutch locks 124 provided as arcuate arms mounted to pivot about one end, around an axis parallel to shaft 18, between an inboard position and an outboard position. In the inboard position, clutch locks 124 sit within arcuate recesses in the outer circumference of the stop 16 (see FIGS. 6a, 6b). In the outboard position, clutch locks 124 project radially outwardly of stop 16 to block axial movement of the follower 24 (by providing a mechanical obstruction to side 114 of the follower 24), thereby to prevent the chain pulley wheel follower from engaging with the stop 16.

The pivotal mounting of the clutch locks 124 is provided by bolts 128 as shown, and each clutch lock 124 is biased toward its inboard position by a spring (not shown).

Safety mechanism 120 prevents the possibility of engagement of the clutch when the shaft 18 is under drive by the operator motor, in the unlikely event that a person pulls on the chain while the roller door or shutter is in powered operation. During such operation, which involves relatively high speed rotation of the shaft 18, clutch locks 124 pivot outwardly into their outboard position under centrifugal force acting to overcome the restraining spring force, and thus obstruct axial movement of the follower 24. When powered operation ceases, the clutch locks 124 are pulled into their inboard position under action of the springs, and are received within their arcuate recesses, so offering no obstruction to the axial movement of follower 24 when manual operation is required. The speed of manual operation does not give rise to centrifugal forces on the clutch locks 124 sufficient to overcome the spring forces that retain them.

It will be appreciated that other suitable forms of safety mechanism may be employed. For example, one or more clutch locks 124 may be associated directly with the shaft 18 to prevent axial movement of the follower 24 when the shaft 18 is under powered drive. The clutch locks 124 may be electrically operated, arranged to move to obstruct axial movement of the follower 24 when the drive motor is energised.

If the shaft 18 is being driven manually by the chain 12, and the motor drive is then activated, the chain may then be rapidly driven by the rotation of the shaft, leading to a safety risk to the chain operator.

As an additional safety measure, the illustrated embodiment includes a micro-switch 132 (see FIG. 3), operably associated with the follower 24. When the follower 24 begins to move axially under the camming operation described above, the micro-switch 132 operates to cut the power to the drive unit 4, thus stopping the rotation of the shaft 18. This further ensures that manual operation of the clutch engagement cannot occur while the roller door or shutter is under powered drive, and in addition ensures that the powered drive cannot be activated while the roller door or shutter is under manual operation.

Generally, the shaft 18 is machined from steel and all external bodies/housings die-cast from aluminium. The cam 20 and follower 24 components may each be plastic formed using typical injection moulding processes known in the art, the plastic material itself being selected so as to be suitable for the present purposes. For the embodiment described, the stop 16 is die-cast from zinc alloy. Those skilled in the art will readily appreciate the suitability of other materials that may be used to produce the components described herein.

Modifications and improvements to the invention will be readily apparent to those skilled in the art. Such modifications and improvements are intended to be within the scope of this invention.

The word 'comprising' and forms of the word 'comprising' as used in this description and in the claims do not limit the invention claimed to exclude any variants or additions.

The invention claimed is:

1. A clutch assembly for providing selective engagement with a rotatable shaft, the assembly comprising:
    a stop arranged to rotate with the shaft;
    a cam arranged to move relative to the shaft;
    a follower arranged for selective operation so to be simultaneously rotatable relative to the shaft and axially movable along the shaft in and out of engagement with the stop;
    wherein the follower is operatively associated with the cam so that rotational movement of the follower about the shaft brings the follower into engagement with the stop by axial movement of the follower, so causing rotation of the shaft.

2. A clutch assembly according to claim 1, wherein the cam is arranged to rotate relative to the shaft, and the assembly is configured such that the cam remains substantially stationary as the follower moves towards engagement with the stop.

3. A clutch assembly according to claim 2, the assembly configured such that, once the follower is engaged with the stop, further rotation of the follower results in rotation of the cam with the follower.

4. A clutch assembly according to claim 3, the assembly configured and dimensioned such that, when the follower engages with the stop, torque is applied by the follower to the cam to rotate the cam about the shaft.

5. A clutch assembly according to claim 2, wherein the assembly includes friction means arranged to restrain movement of the cam about the shaft until further axial movement of the follower is prevented by engagement with the stop.

6. A clutch assembly according to claim 2, wherein the cam includes a surface arranged for frictional engagement with a complementary stationary face of the assembly.

7. A clutch assembly according to claim 6, wherein the complementary stationary face of the assembly comprises one or more spring loaded plunger units arranged so to register with one or more respective recesses formed within the surface of the cam.

8. A clutch assembly according to claim 2, wherein axial movement of the cam along the shaft is limited by a retaining assembly.

9. A clutch assembly according to claim 8, wherein the retaining assembly includes a biasing element, arranged to act on the cam in an axial direction.

10. A clutch assembly according to claim 2, wherein the follower comprises a chain pulley wheel arranged for engaging with a manual device so that the follower may be rotated manually.

11. A clutch assembly according to claim 2, wherein the assembly comprises a biasing element for resiliently biasing the follower away from engagement with the stop.

12. A clutch assembly according to claim 2, wherein the cam is arranged to provide a camming surface shaped to urge the follower axially toward the stop when there is relative movement between the follower and the cam.

13. A clutch assembly according to claim 12, wherein the follower has a face shaped to conform substantially with the camming surface.

14. A clutch assembly according to claim 13, wherein the camming surface is shaped having at least one peak and at least one trough region.

15. A clutch assembly according to claim 2, wherein the cam and follower are provided with complementary abutment portions configured to mutually engage for driving of the cam by the follower.

16. A clutch assembly according to claim 2, wherein the follower and the stop comprise complementary teeth and recesses, the engagement of the follower with the stop involving interaction of the teeth and recesses.

* * * * *